Figure 6:
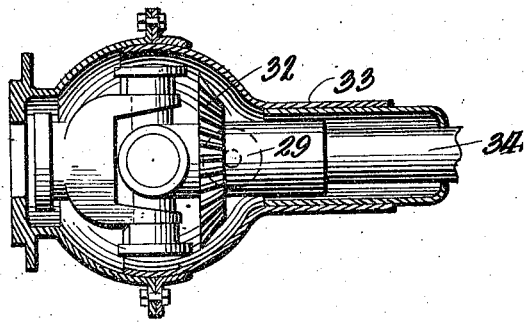

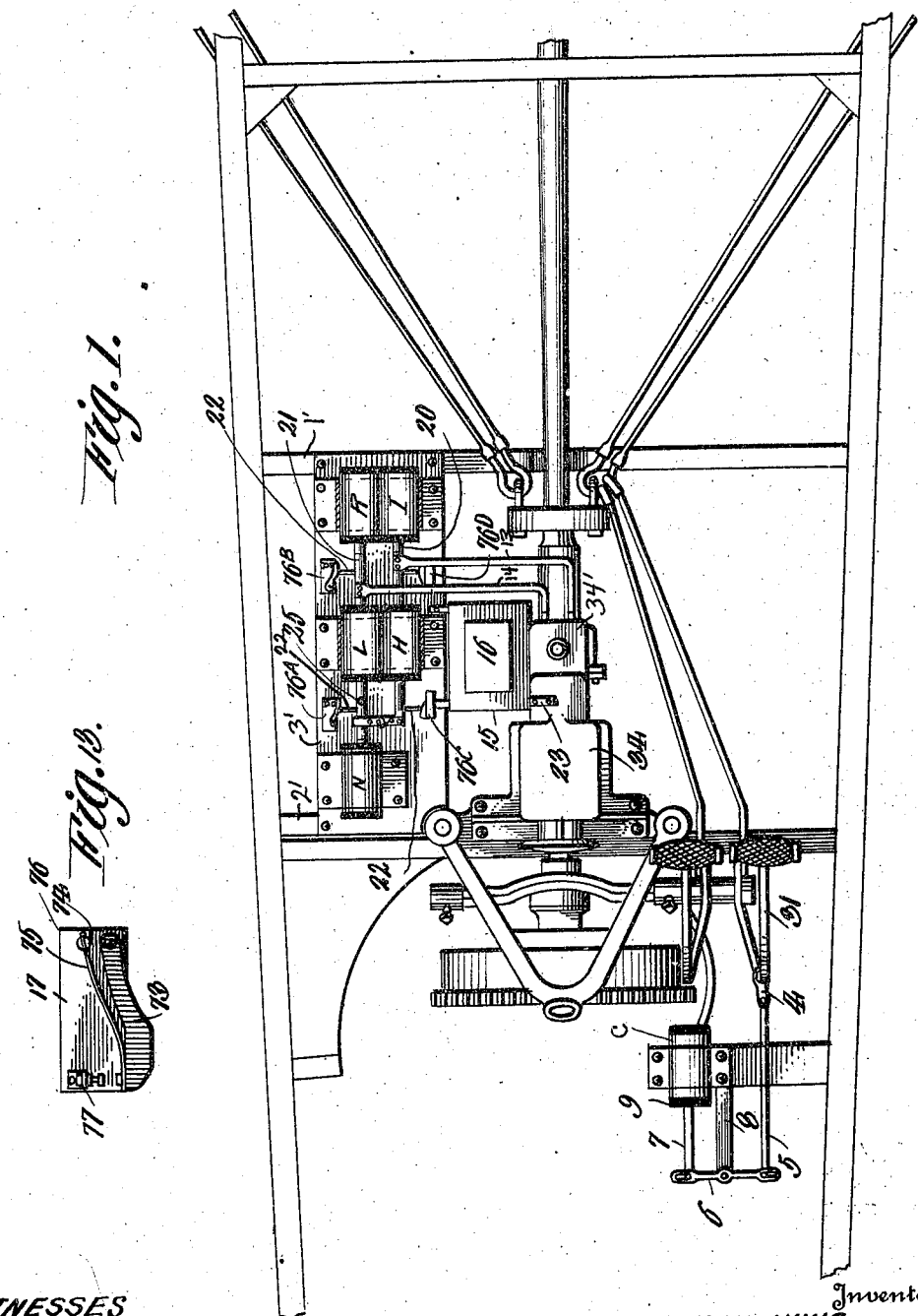

Jan. 26, 1926. 1,570,745
R. W. IVINS
GEAR SHIFTING MECHANISM
Filed July 21, 1922 6 Sheets-Sheet 2
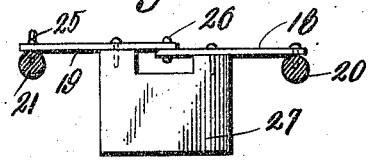
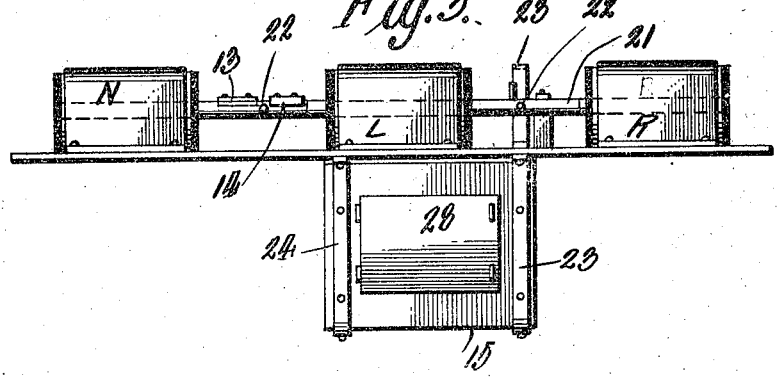
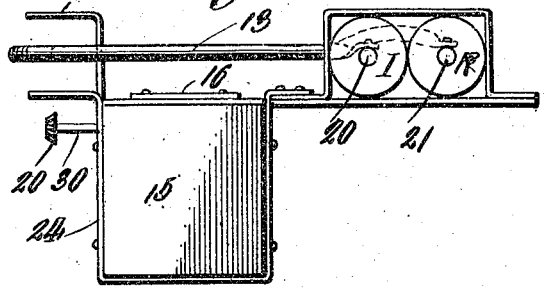
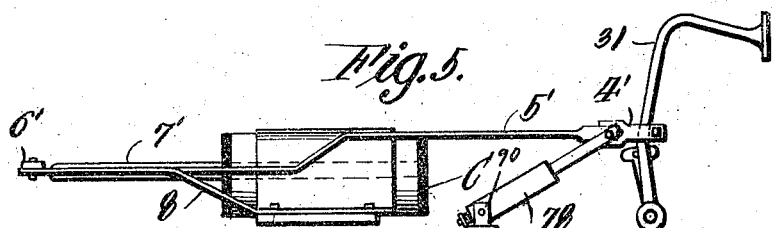
WITNESSES
Guy M Spring
Inventor
RAYMOND W. IVINS
By Richard B Owen, Attorney Jan. 26, 1926.  1,570,745
R. W. IVINS
GEAR SHIFTING MECHANISM
Filed July 21, 1922   6 Sheets-Sheet 3

WITNESSES
Guy M Spring

Inventor
RAYMOND W. IVINS
By Richard B. Owen, Attorney

Jan. 26, 1926.
R. W. IVINS
1,570,745
GEAR SHIFTING MECHANISM
Filed July 21, 1922     6 Sheets-Sheet 4
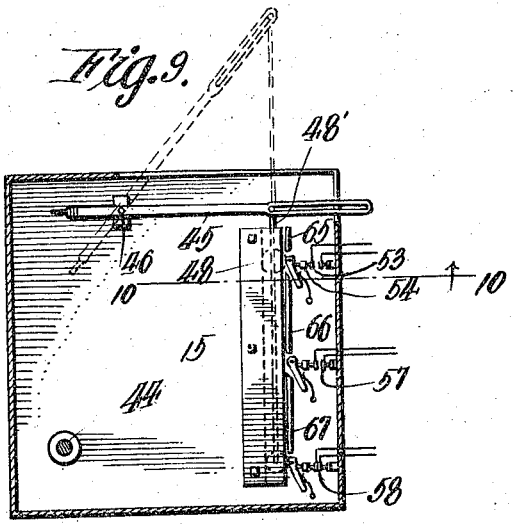
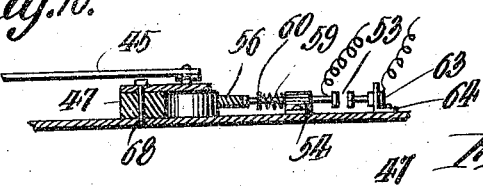
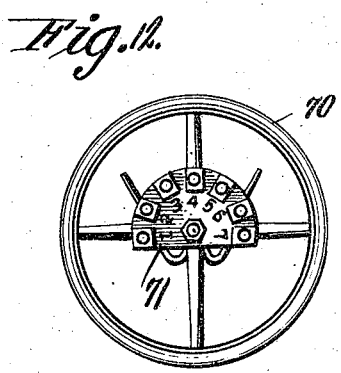
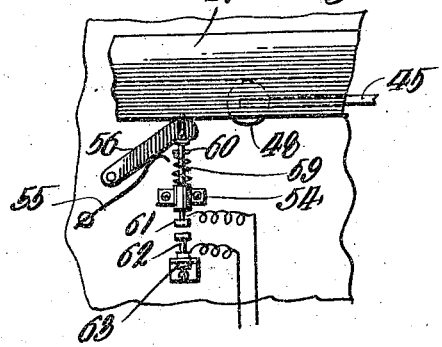
WITNESSES
Inventor
RAYMOND W. IVINS
By Richard B. Owen, Attorney

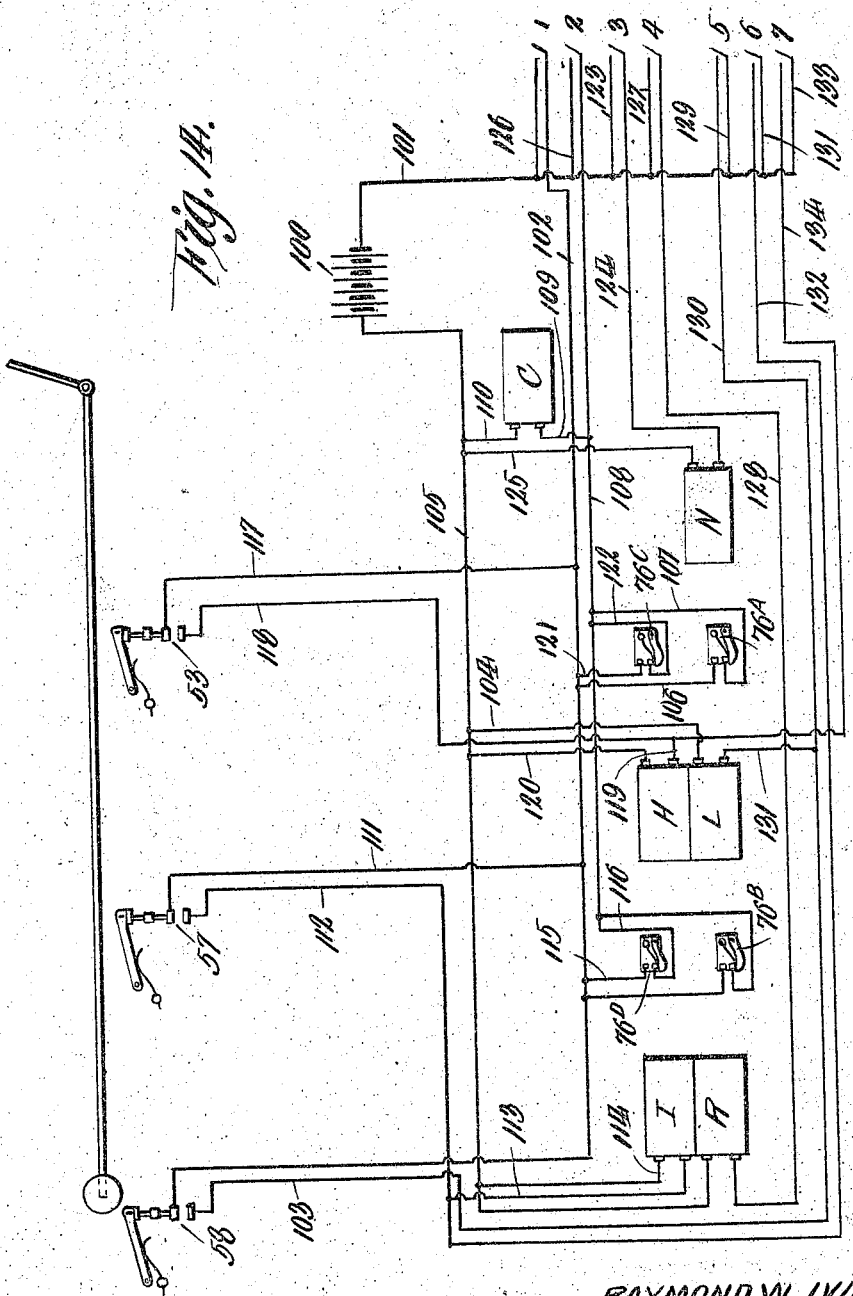

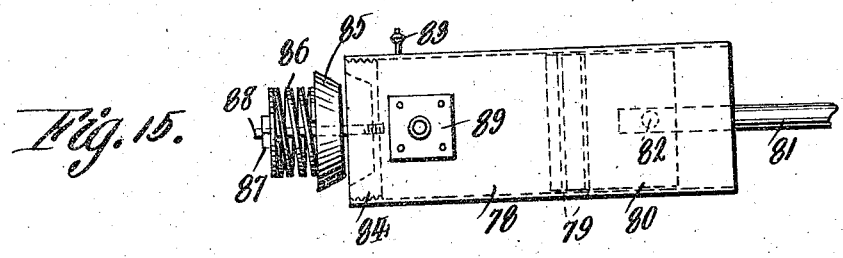
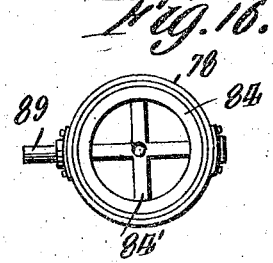
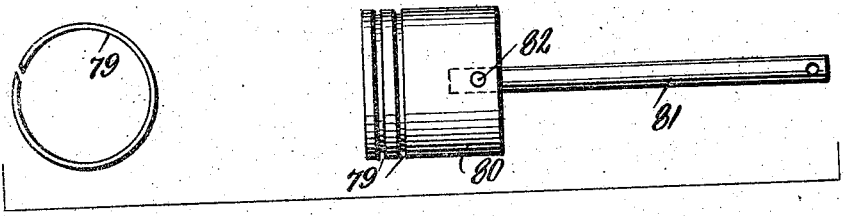

Patented Jan. 26, 1926.

1,570,745

UNITED STATES PATENT OFFICE.

RAYMOND W. IVINS, OF BATTLE CREEK, MICHIGAN.

GEAR-SHIFTING MECHANISM.

Application filed July 21, 1922. Serial No. 576,542.

*To all whom it may concern:*

Be it known that I, RAYMOND W. IVINS, a citizen of the United States, residing at Battle Creek, in the county of Calhoun and State of Michigan, have invented certain new and useful Improvements in a Gear-Shifting Mechanism, of which the following is a specification.

The present invention relates to a gear shifting mechanism especially useful in conjunction with an automobile and has for its principal object to provide means for electrically shifting the transmission gears from low through to high as the speed of the vehicle increases without attention on the part of the operator.

Another important object of the invention is to provide means for preventing any two gears from shifting simultaneously and to prevent two gears from being meshed at the same time.

Another object of the invention is to provide a mechanism of this nature which will operate automatically without attention on the part of the operator or which may be operated so as to shift the gears by the independent use of switches closed individually by the operator.

With the above and numerous other objects in view, as will appear as the description progresses, the invention resides in certain novel features of construction, and the combination and arrangement of parts as will be hereinafter more fully described and claimed.

In the drawing:—

Figure 7:
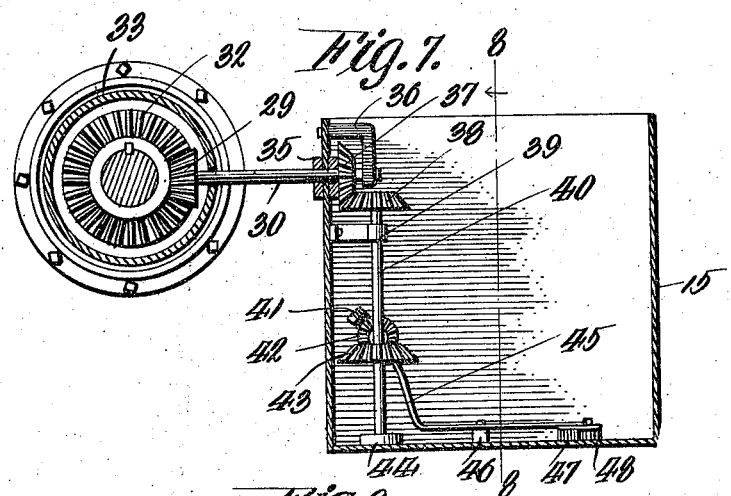
Figure 8:
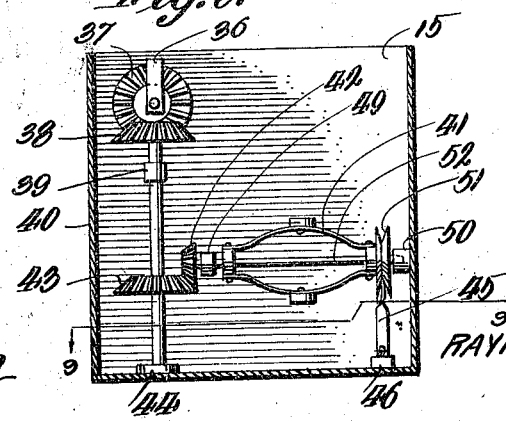

Figure 1 is a top plan of my mechanism showing the same in conjunction with the necessary portions of an automobile, Figure 2 is a detailed view showing the mechanism for preventing two gears from being shifted simultaneously, Figure 3 is an elevation of some of the solenoids used for shifting the gears, Figure 4 is an end elevation of the structure shown in Figure 3, Figure 5 is a detailed elevation of the clutch control solenoid and its co-operating parts, Figure 6 is a detailed section through the housing of the universal joint of the drive shaft of the automobile showing a beveled gear attached thereto, Figure 7 is a transverse section taken therethrough also showing the beam in section, Figure 8 is a detailed section taken substantially on the line 8—8 of Figure 7 looking in the direction of the arrow, Figure 9 is a section taken substantially on the line 9—9 of Figure 8 looking in the direction of the arrow, Figure 10 is a section taken substantially on the line 10—10 of Figure 9, Figure 11 is a top plan of the mechanism shown in Figure 10, Figure 12 is a top plan of a steering wheel showing my switch plate attached thereto, Figure 13 is a plan of one of the switches 76, Figure 14 is a diagram of the circuits used in conjunction with this mechanism, Figure 15 is a side elevation of the checking mechanism for the clutch pedal, Figure 16 is an end elevation thereof, and Figure 17 is an elevation of the piston and ring therefor.

Referring to the drawing in detail it will be seen that the mechanism is mounted upon the chassis of an automobile. The strap irons 1' and 2' are fastened to the chassis and extend transversely thereof in spaced relation to each other for supporting the plates 3'. The solenoids N, L, R, H, and I, are mounted upon this plate as are also the circuit closers 76 being four in number and individually lettered A, B, C and D. The rods 13 and 14 are fastened to the shifting rod in the transmission case 34' and to the armature rods 20 and 21. A box 15 contains the automatic governor switch controlled device which will be later described in detail and is fastened to the plate 3' and the transmission case 34' by the straps 23 and 24. This box 15 is provided with a door 16 so that access may be had to the interior thereof for repairs and the like. A pin 25 is disposed on the armature bar 21 between the solenoids N and L but adjacent the solenoid L. A pair of pins 22 are disposed on the armature bar 21 one being situated between the solenoids N and L and the other being situated between the solenoids R and L. A similar pair of pins 22 are disposed on the armature bar 20 and are disposed one on each side of the solenoid H.

The solenoid C is for operating the clutch pedal and is provided with the armature bar 7 connected with the lever 6 pivoted intermediate its ends to the bracket 8. The other end of this lever 6 is attached to the rod 5 which rod has its ends clamped to the clutch pedal 31 as at 4.

The device for preventing two gears from being shifted simultaneously and also preventing two gears from being meshed at the same time is shown in Figures 1 and 2. The levers 18 and 19 are pivoted together at 26 and pivoted intermediate their ends to the member 27. The end of the lever 18 is pivoted to the solenoid bar 20 while the end of the lever 19 extends above the armature bar 21 and is adapted to be engaged by the pin 25 as will be explained hereinafter.

A universal joint 33 is provided in conjunction with the drive shaft 34. A beveled gear 32 is mounted upon this drive shaft 34 and meshes with a beveled gear 29 carried by the shaft 30 which is journalled at 35 and also in the end of the bracket 36 within the casing 16. The inner end of this shaft is provided with the beveled gear 37 that meshes with the beveled gear 38 carried at the upper end of the shaft 40 which is journalled in the bracket 39 and at 44. This shaft 40 is provided with a beveled gear 43 intermediate its ends that meshes with a beveled gear 42 carried on the governor shaft 52 which is journalled at 49 and 50. The governor mechanism 41 is of the centrifugal type and tends to move the grooved wheel 51 longitudinally on its shaft 52. A lever 45 is fulcrumed at 46 and has its end disposed within the groove of the wheel 51 so as to be fulcrumed thereby as this wheel is moved by the governor mechanism 41 longitudinally of the shaft 52. As is shown to advantage in Figures 9 and 10 the members 47, 65, 66 and 67 form a race for the member 48. Adjacent this race there are disposed a plurality of switches 53, 57 and 58. The contact 61 of each of these switches is provided with a bearing 54 so that it may slide as is shown to advantage in Figure 11. The member 48 closes the three contacts shown in Figure 9 by engaging the lever 56 which is held in place by the spring 55. This causes the sliding of the contact 61 into abutment with the contact 62 mounted in the bushing 63 on the plate 64 whereby a circuit is closed for a purpose hereinafter outlined. It is to be understood that this roller or member 48 is attached to a rod 48' and has its end bent so as to engage the elongated slot in the end of the lever 45 and may move to the positions as indicated in Figure 9. From the description as it has thus far progressed it will be seen that the speed of the drive shaft 34 controls the movement of the lever 45 and this lever in turn controls the closing of the three switches 53, 57 and 58 shown in Figure 9.

In Figure 12 an ordinary steering wheel is disclosed at 70 having thereon the plate 71 upon which is mounted the switches 1 to 7 inclusive.

Referring especially to Figures 5, 15, 16, and 17 is will be seen that a checking mechanism 78 is provided for the clutch pedal 31 which is for the purpose of decreasing the closing speed of the clutch. A piston 80 is mounted in the cylinder 78 and is provided with the rings 79. A connecting rod 81 is attached to the piston 80 by the pin 82. A petcock 83 normally open is situated in the end of the cylinder 78 which is provided with the valve seat 84 for receiving the valve head 85. It is to be noted that the rod 88 is mounted in the cross arms forming the valve seat indicated at 84' upon which the valve head 85 is seatable. The spring 86 is held in place by the nut 87 on the rod 88. The cylinder 78 is provided with the trunnions 89 adapted to be received in the apertures of the plates 90 mounted on the base 91. When the clutch pedal is moved downwardly so as to open the clutch the air in the cylinder will be compressed thereby forcing the valve 85 from its seat 84 and allowing the air to escape. When the pedal is released so that its spring will pull it to a raised position, so as to close the clutch, it will move more slowly because the air will be sucked into the cylinder through the small opening in the petcock 83 and of course this cylinder will fill very slowly.

Referring to Figure 1, in the transmission case 84' there is provided the usual set of stationary gears and the two sliding gears, not shown, as is well understood to produce a reverse motion, and change of speed of the propeller shaft, the shifting rods 13 and 14 are fastened to these sliding gears, 14 being fastened to low and reverse gear and 13 to the intermediate and high gear.

If an electric current is passed through solenoid L the armature bar 21 will be moved into this solenoid L and the rod 14 will be moved into the case 34' pushing the sliding low and reverse gear into low or first position. If an electric current is passed through the solenoid I, the armature bar 20 will be drawn into the solenoid I and the rod 13 will be moved outwardly of the case 34' pulling the intermediate and high sliding gear into intermediate or second position. If the armature bar 21 were in the solenoid R, holding low and reverse sliding gear in reversed position, and an electric current were passed through the solenoid N, the plunger 21 would be drawn into the solenoid L, moving the rod 14 in the case 34' thereby pulling the low and reverse sliding gear out of reverse position and into neutral position.

As the plunger 21 is drawn into the solenoid R, the pin 22 presses upon the contact 76$^B$ closing it and causing an electric current to flow through the solenoid C. The armature bar 7 is drawn into this solenoid C when energized exerting a pull on the clutch pedal 31 through the levers 6 and bar 5 thereby opening the clutch. As the pin 22 passes the contact 76$^B$ it will open, stopping the flow of current through the solenoid B and the clutch will close automatically as will be readily understood.

As was mentioned above the mechanism shown in Figure 2 and also in Figure 1 prevents the two gears from shifting simultaneously and will also prevent the two gears from being in mesh at the same time. If the armature bar 21 has been moved into solenoid L, the pin 25 would be against the lever 19 and the gears would be in a low position. If an electric current were passed through the solenoid I, the armature bar 20 would be drawn into the solenoid I, actuating lever 18 with it, thereby fulcruming lever 19 against pin 25 and pushing the armature bar 21 out of the solenoid L. This would cause the sliding low and reverse gear to be placed in a neutral position before the intermediate and low sliding gear were meshed.

From the description as it has thus far progressed, it is thought that a clear understanding of the operation of the shifting mechanism may be had by referring to Figure 14. Presuming that the motor is running and it is desired to start the automobile forwardly, the switch 1 is closed whereby the current flows from the battery 100 through the wire 101, through switch 1, through wire 102, through circuit closer 58 which is closed by the member 48, through wire 103, through solenoid L, through wire 104, and returned to the battery through wire 105. This energization of the solenoid L causes the armature bar 21 to move through the solenoid L, causing the pin 22 to close the circuit closer 76$^A$ whereby the current passes from the battery 100 through wire 101, through switch 1, through wire 103, through wire 106, through circuit closer 76$^A$, through wire 107, through wire 108, through wire 109, through solenoid C, through wire 110 and through wire 105 to the battery 100. This energization of the solenoid C causes the clutch to move to an open position. After the pin passes by the circuit closer 76$^A$ the solenoid C will be deenergized and the gears will be shifted to a low position and the clutch will return slowly to a closed position. At this time the speed of the motor will be increased just as when running an automobile with the ordinary hand shifting mechanism.

As the speed of the propeller shaft increases the automatic mechanism including the governor will cause the member 48 to move upwardly breaking the circuit at 58 thereby causing the deenergization of the solenoid L and moving to an intermediate position so as to close the circuit closer 57. At this point the current will flow from the battery 100 through the wire 101, through the switch 1, through the wire 102, through the wire 111, through the circuit closer 57, through the wire 112, through the wire 113, through the solenoid I, through the wire 114, and through the wire 105 to the battery 100. This energization of the solenoid I, causes the armature bar 20 to move therein for shifting the gears to an intermediate position. As the armature bar 20 is moved the pin 22 adjacent thereto will cause the closing of the circuit breaker 76$^D$ so that the current will pass through the wire 101, through switch 1, through wire 102, through wire 115, through circuit closer 76$^D$, through wire 116, through wire 108, through wire 109, through solenoid C, through wire 110, and returned to the battery through wire 105. This causes the clutch to move to an open position while the gears are being shifted to the intermediate position. After the pin 22 passes the circuit closer the circuit closer 76$^D$ will be open and the solenoid C deenergized so that the clutch will slowly move to a closed position after the gears have been shifted to the intermediate position. The engine is then accelerated and as the propeller shaft increases in speed the automatic device will be moved so that the member 48 will allow the circuit closer 57 to be opened and the circuit closer 53 to be closed.

The closing of the circuit closer 53 allows the current to pass from the battery 100, through the battery 101, through the switch 1, through the wire 102, through the wire 107, through the circuit closer 53, through the wire 118, through the wire 119, through the solenoid H, through the wire 120, and returned to the battery through the wire 105. This causes the energization of the solenoid H thereby actuating the armature bar 20 so as to move thereinto for shifting the gears to the high position and in so moving the pin 22 will close the circuit breakers 76$^C$ whereby a current passes from the battery 100, through the wire 101, through the switch 1, through the wire 102, through the wire 121, through the circuit closer 76$^C$, through the wire 122, through the wire 108, through the wire 109, through solenoid C, through wire 110, and returns to the battery through wire 105. This energization of the solenoid C causes the clutch to open as the gears are being shifted and as the pin 22 passes by the circuit closer 76ᴮ the solenoid C is deenergized and the clutch will move to a closed position slowly after the gears have been shifted to a high position.

As the propeller shaft continues to be accelerated the member 48 will be moved so as to allow the circuit closer 53 to open thereby causing the deenergization of the solenoid H and the gears will remain in their high position. If the car is to be stopped the gas throttle is almost closed. The governor will decrease in speed and the lever 45 will be moved backwardly pushing the member 48 toward the lower end of the brace 47. This member 48 will close the circuit closer 53 as it passes but this will have no effect upon the gears as they are already in a high position.

As the member 48 engages the circuit closer 59 so as to close the same the gears will be shifted to an intermediate position as previously explained and as this member engages the circuit closer 58 the gears will be shifted to a low position as previously explained. When it is desired to stop the car the switch is open and the switch closed so that the current may pass through the wire 101, wire 123, switch 3, wire 124, solenoid N, wire 125, and returned to the battery through wire 105 thereby energizing the solenoid N and drawing the armature bar 21 back through solenoid L so that the low and reverse sliding gear will be in a neutral position. About five seconds is the length of time necessary to leave the switch 3 closed and it can then be opened.

When it is desired to place the gears in reverse the switch 2 is closed causing the current to pass from the battery through the wire 101, wire 126, switch 2, wire 108, wire 109, through the solenoid C, through wires 110 and 105 to the battery. This causes the energization of the solenoid C and opens the clutch. The switch 4 is then closed so that the current passes from the battery through wire 101, through wire 127, through switch 4, through wire 128, through solenoid R, through wire 105 to the battery. This energizing of the solenoid R will cause the plunger 21 to be drawn thereinto and place the gears in a reverse position. The switch 2 may then be opened so as to allow the clutch to close.

If the circuit closers 53, 57 and 58 fail to work and the automatic device fails to work, the gears may be shifted by closing the switches 5, 6 and 7 moving the clutch to an open position by means of the switch 2 as previously indicated. When the switch 5 is closed the current passes through the wire 101, wire 129, switch 5, wire 130, wire 131, solenoid L, and returns to the battery through wires 104, and 105. When the switch 6 is closed the current passes from the battery through wire 101, through wire 131, switch 6, wire 132, wire 113, solenoid I, wire 114, and wire 105 to the battery. When the switch 7 is closed the current passes from the battery through the wire 101, wire 133, switch 7, wire 134, wire 119, solenoid H, wire 120, and wire 105 to the battery.

Having thus described my invention what I claim as new is:—

1. In combination, a vehicle, driving means associated with the vehicle including a transmission having a plurality of speeds, solenoids for operation of each speed of transmission, circuits including the solenoid and circuit breakers, a lever for each circuit breaker, a spring associated with each lever normally holding the circuit breaker in an open position, a raceway disposed adjacent the levers, a member movable in the raceway contacting with the levers so as to close the circuit breakers, a governor controlled by the speed of the driving means, and means actuated by the governor for moving the member in the raceway.

2. In combination, a vehicle, driving means associated with the vehicle including a transmission having a plurality of speeds, solenoids for operation of each speed of transmission, circuits including the solenoid and circuit breakers, a lever for each circuit breaker, a spring associated with each lever normally holding the circuit breaker in an open position, a raceway disposed adjacent the levers, a member movable in the raceway contacting with the levers so as to close the circuit breakers, a governor controlled by the speed of the driving means, and another lever disposed adjacent the governor, said governor including a grooved wheel shiftable by the governor as it changes its speed, said last mentioned lever having one end in engagement with the grooved wheel and the other in engagement with the member movable in the raceway.

In testimony whereof I affix my signature.

RAYMOND W. IVINS.